United States Patent
Heidan et al.

(10) Patent No.: US 9,493,059 B2
(45) Date of Patent: Nov. 15, 2016

(54) DRIVE SYSTEM FOR A MOVABLE ROOF PART OF A MOTOR VEHICLE ROOF MODULE

(71) Applicants: Michael Heidan, Stuttgart (DE); Hartmut Eberst, Schwaebisch Gmuend (DE); Waldemar Stapler, Boeblingen (DE)

(72) Inventors: Michael Heidan, Stuttgart (DE); Hartmut Eberst, Schwaebisch Gmuend (DE); Waldemar Stapler, Boeblingen (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 14/855,805

(22) Filed: Sep. 16, 2015

(65) Prior Publication Data

US 2016/0107514 A1    Apr. 21, 2016

(30) Foreign Application Priority Data

Oct. 17, 2014 (DE) .................. 10 2014 221 120

(51) Int. Cl.
| | |
|---|---|
| B60J 7/057 | (2006.01) |
| B60J 7/19 | (2006.01) |
| B60J 7/05 | (2006.01) |
| B60J 7/053 | (2006.01) |
| B60J 7/02 | (2006.01) |

(52) U.S. Cl.
CPC ............ *B60J 7/057* (2013.01); *B60J 7/024* (2013.01); *B60J 7/05* (2013.01); *B60J 7/053* (2013.01)

(58) Field of Classification Search
CPC ............ B60J 7/05; B60J 7/024; B60J 7/057
USPC .................................. 296/221, 224
See application file for complete search history.

(56) References Cited

U.S. PATENT DOCUMENTS

| | | | |
|---|---|---|---|
| 4,647,106 A | 3/1987 | Fuerst | |
| 4,971,386 A * | 11/1990 | Bohm | B60J 7/0084 296/213 |
| 5,020,849 A * | 6/1991 | Schlapp | B60J 7/05 296/221 |
| 7,055,898 B2 | 6/2006 | Manders et al. | |
| 2005/0116512 A1 | 6/2005 | Manders et al. | |

FOREIGN PATENT DOCUMENTS

| | | |
|---|---|---|
| CN | 204623082 U | 9/2015 |
| DE | 602 21 716 T2 | 4/2008 |
| DE | 10 2006 060 369 A1 | 6/2008 |
| DE | 10 2009 041 903 B3 | 3/2011 |
| DE | 10 2011 085 177 A1 | 4/2013 |
| EP | 0 154 759 A2 | 9/1985 |
| EP | 2 650 156 A1 | 10/2013 |
| FR | 2 971 458 A1 | 8/2012 |
| WO | WO 2014/045338 A1 | 3/2014 |

OTHER PUBLICATIONS

Office Action in European Patent Office issued in Application No. EP 15 18 3550 with English translation of category of cited documents dated Apr. 1, 2016 (9 pages).

* cited by examiner

*Primary Examiner* — Dennis H Pedder
(74) *Attorney, Agent, or Firm* — Flynn, Thiel, Boutell & Tanis, P.C.

(57) ABSTRACT

A drive system for a movable roof part of a motor vehicle roof module having at least one support bar fastened to the roof part, at least one control carriage movable linearly via a drive arrangement in a guide track running laterally along the roof part, at least one deployment mechanism which pivots, raises and lowers the support bar and the roof part, and a stationary roof region arranged behind the movable roof part. The movable roof part is pivotable from a closed position into a lifted position, is lowerable into an open position and is movable rearward under the roof region. The support bar is mounted so as to be pivotable about a pivot joint on a compensating element which, depending on the movement position of the roof part, is shiftable relative to a front guide arrangement of the deployment mechanism into different positions.

13 Claims, 7 Drawing Sheets

Fig. 7

DRIVE SYSTEM FOR A MOVABLE ROOF PART OF A MOTOR VEHICLE ROOF MODULE

CROSS-REFERENCE TO RELATED APPLICATIONS

This claims priority from German Patent Application No. 10 2014 221 120.4, filed on Oct. 17, 2014, the disclosure of which is hereby incorporated by reference in its entirety into this application.

FIELD OF THE INVENTION

The invention relates to a drive system for a movable roof part of a motor vehicle roof module, with at least one support bar which is fastened laterally to the roof part, with at least one control carriage which is movable linearly via a drive means in a guide track running laterally along the roof part, with at least one deployment mechanism which pivots, raises and lowers the support bar and therefore the roof part, and with a stationary roof region arranged behind the movable roof part in the longitudinal direction of the vehicle, wherein the movable roof part is pivotable from a closed position into a lifted position and is lowerable into an open position and is movable rearward under the roof region.

BACKGROUND OF THE INVENTION

Such a drive system is generally known for tilt and slide roof modules in passenger vehicles. The roof module has a front movable roof part and a stationary rear roof region. A guide track via which the movable roof part is shiftable between a closed position and an open position is provided on both opposite longitudinal sides of the roof module. In the open position, the movable roof part is displaced rearward in the longitudinal direction of the vehicle under the stationary roof region. In order to shift the roof part, a control carriage is provided in each guide track, wherein the two opposite control carriages are shifted along the guide tracks via synchronized drive means. In addition, a deployment mechanism is assigned to the roof part on both of the opposite sides thereof, said deployment mechanisms being actuated, likewise in a synchronized manner with respect to each other, in order to pivot the roof part upward into a ventilation position and in order to lower same downward for the transfer into an open position, and in order finally to transfer the roof part again into the closed position thereof.

SUMMARY OF THE INVENTION

It is the object of the invention to provide a drive system of the type mentioned at the beginning which, with simple means, permits a reliable transfer of the movable roof part into the various intermediate and end positions thereof.

This object is achieved in that the support bar is mounted at the front end region thereof so as to be pivotable about a pivot joint on a compensating element which, depending on the movement position of the roof part, is shiftable relative to a front guide arrangement of the deployment mechanism into different positions. According to the invention, the various functional parts are arranged in a reflected manner in the region of the opposite longitudinal sides of the roof part, and therefore the functional parts described, such as the control carriage, the support bar, the front guide arrangement and the compensating element are in each case provided in pairs. Since, however, the opposite functional parts are of mirror-symmetrical design relative to a vertical central longitudinal plane of the vehicle and are movable in a synchronized manner with respect to each other, for simplification purposes only the drive system on one side is described below. The correspondingly opposite side is designed analogously. The solution according to the invention is suitable in a particularly advantageous manner for use in a passenger vehicle, wherein the drive system together with the movable roof part and the stationary roof region are preferably provided preassembled in a roof module, which can be handled as a constructional unit. When the roof module is installed in a corresponding roof opening of the passenger vehicle, the connection to functional sections correspondingly provided on the vehicle side, in particular on the roof side, then takes place. The compensating element ensures that the movable roof part, during a transfer from a ventilation position, in which the roof part is deployed obliquely upward, into an open position, can be guided with the front and/or rear end edge region thereof past corresponding component sections or functional sections of the stationary roof region, or of a front-side frame part of the roof module during a lowering movement downward, without coming into contact with the corresponding functional sections or component sections. The same applies in a reverse return of the roof part from the open position into the closed position and the ventilation position. In the open position, the roof part is lowered downward under the roof outer contour, which is defined by the stationary roof region, and, spaced apart in the vertical direction from the rear roof region, is displaced rearward under the latter. The solution according to the invention permits the provision just of one single guide track in a single guide plane, as a result of which the overall height of the drive system is reduced and increased headroom is available within the vehicle interior of the passenger vehicle.

In a refinement of the invention, the compensating element is designed as a compensating lever which is mounted on the guide arrangement so as to be pivotable about a pivot axis, and which comprises a control section and a compensating extension, which protrude on opposite sides relative to the pivot axis, wherein the compensating extension bears the pivot joint of the support bar, and the control section is coupled mechanically to the control carriage. Via corresponding pivoting movements of the compensating extension carrying the pivot joint of the support bar, the compensating lever permits the desired relative movements of the roof part during a transfer into different movement positions, in order to be able to guide the roof part past the adjacent functional sections of the roof module. Via the control section of the compensating lever, which is coupled to the control carriage, the corresponding compensating movements of the compensating extension can take place depending on the respective position of the control carriage and therefore depending on the corresponding movement positions of the roof part (of the support bar).

In a further refinement of the invention, the mechanical coupling of the control section to the control carriage is designed as a slotted guide mechanism which combines a relative longitudinal displacability with a relative vertical shiftability between the control section and the control carriage in order, depending on the movement position of the roof part and of the support bar, to bring about a pivoting of the compensating extension about small pivot angles. The slotted guide mechanism brings about forced guidance of the compensating lever and therefore of the compensating extension depending on the movement of the control carriage, as a result of which the desired compensating movements are achieved in the region of the pivot joint of the support bar.

In a further refinement of the invention, the slotted guide mechanism comprises a wraparound profile which wraps around the control section at least in sections in cross section, and the control section is designed as a dimensionally stable control bar which is provided with sections of curvature distributed in the vertical direction over the length thereof. The wraparound profile preferably wraps around the cross section of the control section completely in order thereby to achieve flanking of the control section on all sides by the wraparound profile. Owing to the sections of curvature of the control section configured as a control bar, a relative movement between the wraparound profile and the control section inevitably also results in vertical shifting, i.e. pivoting of the control section, as a result of which, owing to the integral continuation beyond the pivot axis into the compensating extension, the compensating extension is inevitably also pivoted in a desired manner.

In a further refinement of the invention, the wraparound profile is arranged rigidly on the control carriage. A longitudinal shifting of the control carriage therefore inevitably leads to a complementary longitudinal shifting of the wraparound profile, as a result of which the desired movement transmissions to the curved control bar are brought about using simple means.

In a further refinement of the invention, the control carriage and the front guide arrangement are movable in a common guide track. Accordingly, a longitudinal shifting of control carriage and guide arrangements takes place on opposite longitudinal sides of the roof part in a common, single guide plane, as a result of which the drive system for the roof part requires an only small overall height. An increase in the headroom of the vehicle interior of the passenger vehicle is inevitably achieved by this means.

In a further refinement of the invention, the front guide arrangement is assigned a latching arrangement which, depending on a movement position of the roof part and of the support bar relative to the guide track, blocks the guide arrangement or releases same for longitudinal shifting. The latching arrangement keeps the front guide arrangement in a defined position while the movable roof part is shiftable between the closed position thereof and the ventilation position thereof. In addition, the latching arrangement also keeps the front guide arrangement in the blocked position still when the roof part is shifted downward relative to the outer contour of the roof region, in order to initiate a displacement of the roof part rearward into the open position under the roof region.

In a further refinement of the invention, the latching arrangement has a latching lever which, in the locking position thereof, is supported in a form-fitting manner in a latching receptacle of the guide track, and the control carriage has a driver arrangement which, depending on the movement position of the roof part and of the support bar, lifts the latching lever out of the latching receptacle and carries along the latching lever. The driver arrangement ensures that the front guide arrangement is released for carrying the roof part along rearward into the open position.

In a further refinement of the invention, the latching lever is coupled to the front guide arrangement so as to be pivotable about the pivot axis of the compensating lever. This is a particularly simple and functionally reliable arrangement of the latching lever.

In a further refinement of the invention, the latching lever is extended rearward from the pivot axis and, on the rear end region thereof, has a latching lug which interacts in a form-fitting manner with the latching receptacle of the guide track. The latching lug in conjunction with the stationary latching receptacle in the guide track brings about blocking or release of the latching lever and therefore of the front guide arrangement, depending on the lifted-out position or blocked position of the latching lug.

BRIEF DESCRIPTION OF THE DRAWINGS

Further advantages and features of the invention emerge from the claims and from the description below of a preferred embodiment of the invention, which is illustrated with reference to the drawings.

DETAILED DESCRIPTION

According to FIGS. 1 to 4, a passenger vehicle has a vehicle roof 2 in which a roof module 1 is integrated. The roof module 1 has a stationary roof region 3 and a movable roof part 4 which, as seen in the longitudinal direction of the vehicle, is arranged in front of the stationary roof region 3. In a closed position of the movable roof part 4 (FIG. 1), a surface of the roof part 4 ends flush with a roof outer contour of the vehicle roof 2 and of the stationary roof region 3. The movable roof part 4 is shiftable by means of a drive system, which is described in more detail below and is indicated with reference to reference numbers 6 to 8 in FIGS. 1 to 4, between the closed position according to FIG. 1, a ventilation position according to FIG. 2 and an open position according to FIG. 4. In the ventilation position, the roof part 4 is pivoted upward about a pivot axis, which extends in the transverse direction of the vehicle, in the region of a front end edge region, and therefore a rear end edge region of the roof part 4 protrudes upward over an outer contour of the rear roof region 3. In order to transfer the roof part 4 from the ventilation position or from the closed position into the open position according to FIG. 4, the roof part 4 is lowered downward via an intermediate position according to FIG. 3 in order to be able to be moved rearward in the longitudinal direction of the vehicle below the stationary roof region 3.

Figure 4:
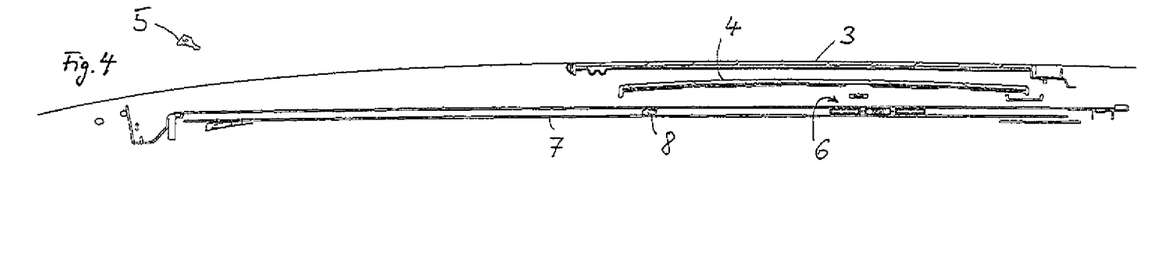

In addition, the roof module has a deployment lever 5 which is provided in the region of a front end edge of the roof opening closeable by the roof part 4 and which, in the open position of the roof part 4 according to FIG. 4, pivots out upward in order to define a flow directing structure which reduces wind noises during the driving mode when the roof part 4 is open.

In order to shift the roof part 4 between said different movement positions, a drive system which is described in more detail with reference to FIGS. 5 to 14 is provided. The roof part 4 is fastened on the opposite sides thereof to respective support bars 9 which are part of the drive system. On the opposite sides of the movable roof part 4, the drive system has, mounted on the vehicle, a respective guide rail arrangement 7 which serves as a guide track within the meaning of the invention. The two guide rail arrangements 7 on opposite sides of the movable roof part 4 each extend parallel to each other in the longitudinal direction of the vehicle. A respective control carriage 6 is guided in a linearly displaceable manner in each guide rail arrangement. Each control carriage 6 is displaceable along the respective guide rail arrangement 7 via a respective drive means in the form of a longitudinally extending tension/compression means, preferably in the form of a flexible shaft. The two tension/compression means are driven synchronously by an electromotive drive unit (not illustrated), and therefore the two control carriages 6 are shifted synchronously with respect to each other in the guide rail arrangements 7 on the opposite sides of the movable roof part 4. Each control carriage 6 acts, via a front guide arrangement 8 (described in more detail below) and a deployment mechanism (likewise described in more detail below), on the respective support bar 9, which is fastened in each case to one side of the roof part 4. By this means, the desired deployment, lowering and longitudinal shifting movements of the roof part 4 can be achieved. For clarity reasons, the drive system is described with reference to FIGS. 5 to 14 only for the left drive side of the roof part 4, as seen in the direction of travel. The right drive side of the drive system for the roof part 4, as seen in the direction of travel, is designed mirror-symmetrically, but otherwise identically, and therefore the explanations with regard to FIGS. 5 to 14 apply in the same manner to said right drive side.

The support bar 9 is mounted at the front end region thereof on a compensating lever 10 so as to be pivotable about a pivot joint 12, wherein the pivot joint 12 defines a joint axis extending in the transverse direction of the vehicle. The compensating lever 10 is mounted on a front guide arrangement 8 so as to be pivotable about a pivot axis S which extends parallel to the joint axis of the pivot joint 12. The guide arrangement 8 has two sliding feet (not denoted specifically) which are guided in a longitudinally displaceable manner in the guide rail arrangement 7. A pivot mounting, which defines the pivot axis S, both for the compensating lever 10 and for a front end of a latching lever 16 (described in more detail below), which extends from the front guide arrangement 8 rearward in the longitudinal direction of the guide rail arrangement 7, is defined between the sliding feet. The compensating lever 10 has an compensating extension 11 which extends obliquely upward and forward from the pivot mounting, which defines the pivot axis S, in the region of the front guide arrangement 8. The pivot joint 12 for the support bar 9 is arranged on a front end region of the compensating extension 11. A control section 13 which, like the compensating extension 11, is an integral part of the compensating lever 10, extends rearward in the opposite direction. The control section 13 forms a dimensionally stable control bar which extends freely rearward in the longitudinal direction and which is provided with a plurality of different sections of curvature extending in the vertical direction of the vehicle. The different configuration of the sections of curvature can readily be seen with reference to the side views according to FIGS. 5, 8, 11 and 12. The control bar 13 extends freely rearward and is wrapped around in the region of the control carriage 6 by a wraparound profile 20. The control bar 13 is guided in a linearly displaceable manner in the wraparound profile 20. The wraparound profile 20 is arranged rigidly on the control carriage 6 which, in turn, is guided in a longitudinally displaceable manner in the guide rail arrangement 7 via a plurality of sliding feet 22. In addition, the control carriage 6 has a contact body 23 to which the tension/compression means, forming the drive means, of the drive unit is fastened in order to displace the control carriage 6 forward or rearward along the guide rail arrangement 7. Owing to the fact that the control bar is provided with sections of curvature extending in the vertical direction of the vehicle and the control bar 13, over the length thereof, has a constant cross section which is guided in a linearly movable manner in the wraparound profile 20, the control bar 13 is pivoted slightly about the pivot axis S depending on the movement position of the control carriage 6 at a particular instant. As a result, the compensating extension 11 inevitably also carries out slight pivoting movements in the same direction relative to the pivot axis S, and therefore the pivot joint 12 is inevitably pivoted slightly upward or downward relative to the pivot axis S. This leads to desired compensating movements of the front end region of the support bar 9, which will be discussed in more detail below.

The support bar 9 furthermore has a control contour 15 which is curved in a vertical longitudinal plane of the vehicle and is provided on a lower edge region of the support bar 9 over a large part of the length of the support bar 9. The control contour or slide 15 is arranged fixedly on the support bar 9 and extends in an identical manner on opposite longitudinal sides of the support bar 9 (see in particular FIG. 6). The control slide is wrapped around on both sides by respective sliding profiles 14 which are arranged rigidly on the control carriage 6. Between the sliding blocks 14 and the control slide 15 there is a form-fitting connection in the vertical direction of the vehicle, whereas the control slide 15 can slide along the sliding blocks 14 in the longitudinal direction of the vehicle. In the vertical direction of the vehicle, the sliding blocks 14 wrap around the control slide 15 in a manner substantially free from play, and therefore, when the control carriage 6 is shifted, the support bar 9 is inevitably shifted upward and downward about the joint axis of the pivot joint 12 because of the forced guidance via the sliding blocks 14 and the control slide 15.

In addition, each drive side of the drive system also has a latching lever 16 which extends rearward from the front guide arrangement 8 and is provided on its rear end region with a downwardly protruding latching lug 18. The base of the guide rail arrangement 7 has a latching receptacle 19 which is complementary with respect to the latching lug 18 and in which the latching lug 18 is held in a form-fitting manner in the latching position of the latching lever 16. In addition, the latching lever 16 is provided, in the rear region thereof, at a small distance from the latching lug 18 with a driver contour 17 which is open forward and obliquely upward and is configured as a hook-like receptacle. A driver pin 21 interacts with said driver contour 17, the driver pin protruding from the control carriage 6 in the transverse direction of the vehicle on a side opposite the wraparound profile 20 and being fastened to the control carriage 6. The driver pin 21 overlaps the latching lever 16 in the transverse direction of the vehicle, as can be seen with reference to FIGS. 6, 7, 9, 10, 13 and 14. Within the movement range of the driver pin 21, the latching lever 16 is provided with a rectilinear and flat surface which provides a sliding surface 24 for the driver pin 21. The driver contour of the latching lever 16, which driver contour is also referred to as driver slot 17, has a thrust slope which is configured in such a manner that the driver pin 21, on entry into the driver slot 17, inevitably lifts the latching lug 18 upward by the driver pin 21 sliding along the sloping plane of the driver contour 17 and thus pivoting the latching lever 16 slightly upward about the pivot axis S. As a result, the latching lever 16 comes free from the locked position thereof in the latching receptacle 19 and can be shifted together with the control carriage 6 in the guide rail arrangement 7.

As can be seen with reference to FIGS. 5 to 14, the compensating lever 10 extends with the control bar 13 thereof laterally parallel outside the support bar 9, whereas the latching lever 16 runs with the sliding surface 24 thereof parallel on the inside of the support bar 9. Accordingly, the driver pin 21 also protrudes inward from the control carriage 6 towards the center of the vehicle, whereas the wraparound profile 20 wraps around the control bar 13 of the compensating lever 10 in the region of the outer side of the control carriage 6.

Figure 1:
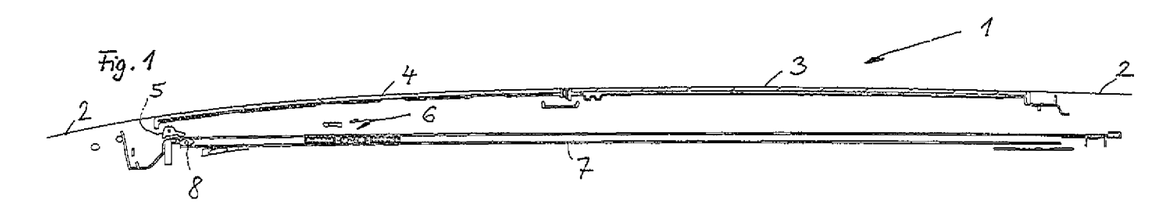
FIGS. 1 to 4 show a roof module of a passenger vehicle with a movable roof part which is transferable via an embodiment of a drive system according to the invention into the illustrated different movement positions.
Figure 2:
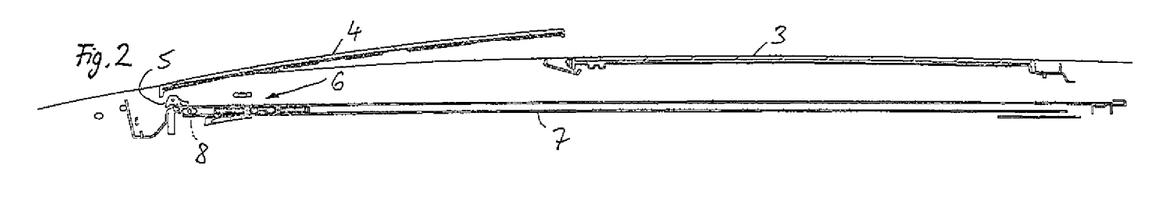
Figure 5:
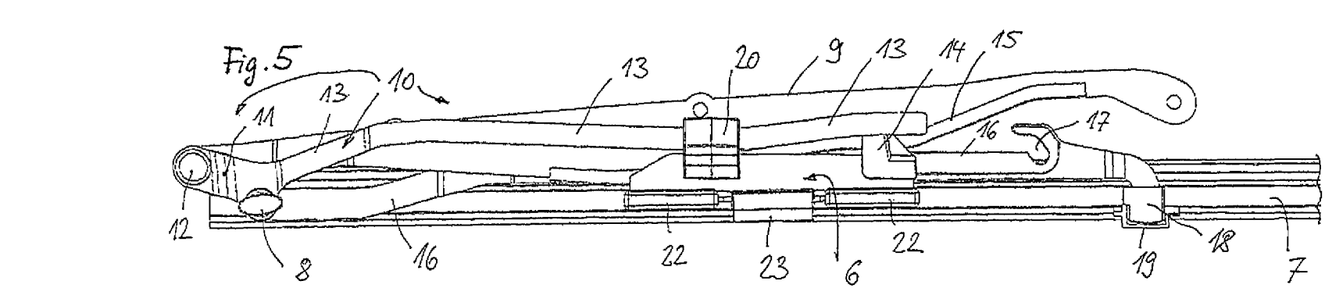
FIG. 5 shows, in an enlarged side view, the drive system for the roof part according to FIGS. 1 to 4 in a closed position of the roof part.
Figure 6:
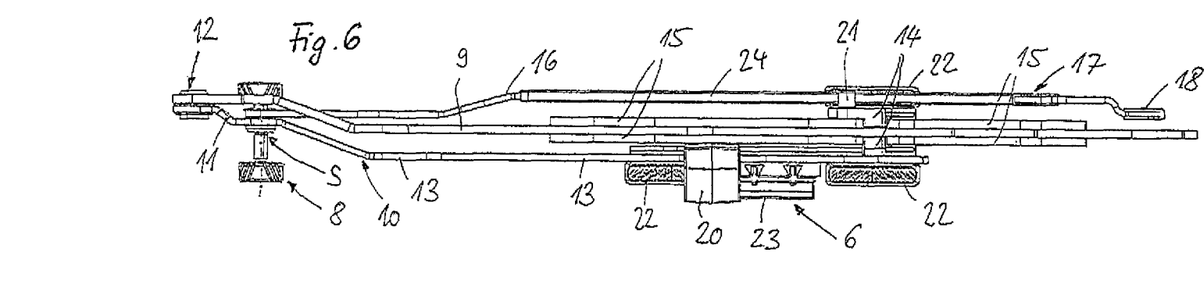
FIG. 6 shows a top view of the drive system according to FIG. 5 with a guide rail arrangement being left out.
Figure 7:
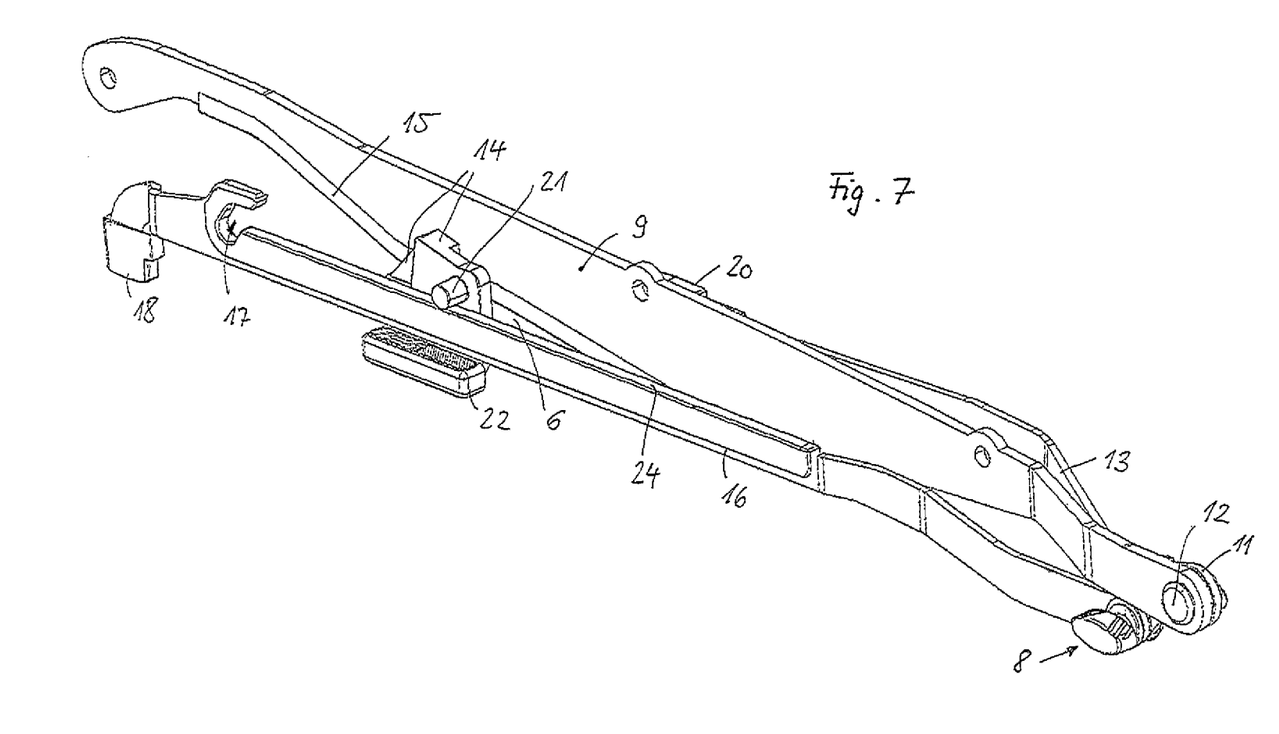
FIG. 7 shows, in an enlarged perspective illustration, the drive system according to FIGS. 5 and 6 in the closed position according to FIG. 1.

In the closed position of the roof part 4 according to FIG. 1, the drive system with support bar 9, compensating lever 10, latching lever 16 and control carriage 6 is in the position as illustrated with reference to FIGS. 5 to 7. In the ventilation position of the roof part 4, the control carriage 6 according to FIGS. 8 to 10 is moved forward in the guide rail arrangement 7, with the latching lug 18 remaining in the latching receptacle 19 because of the support of the driver pin 21 on the sliding surface 24.

Figure 3:
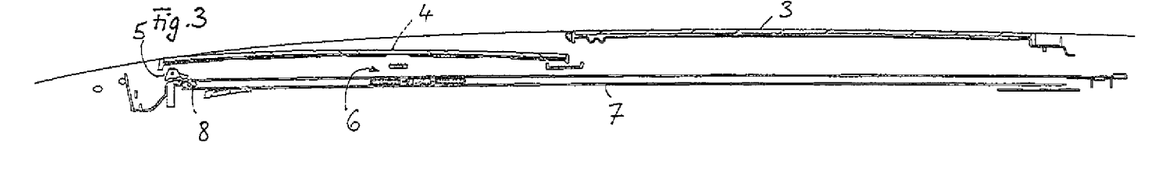
Figure 8:
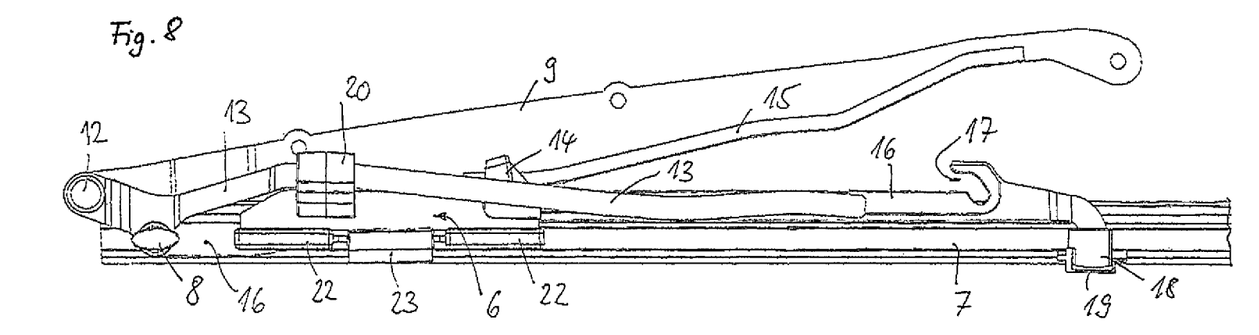
FIG. 8 shows the drive system according to FIG. 5 in a ventilation position according to FIG. 2.
Figure 9:
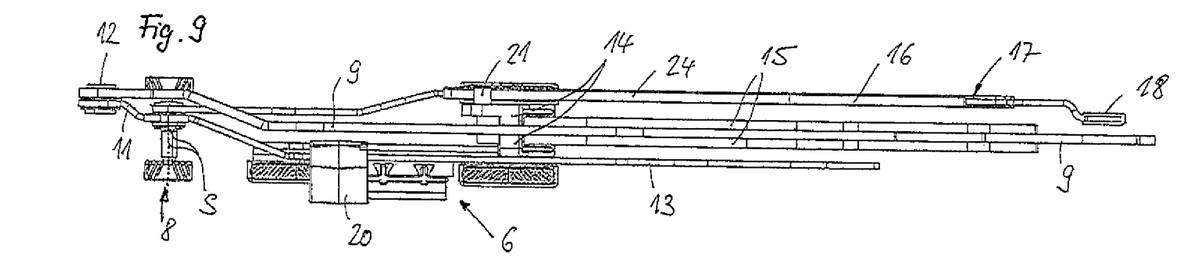
FIG. 9 shows a top view of the drive system according to FIG. 8.
Figure 10:
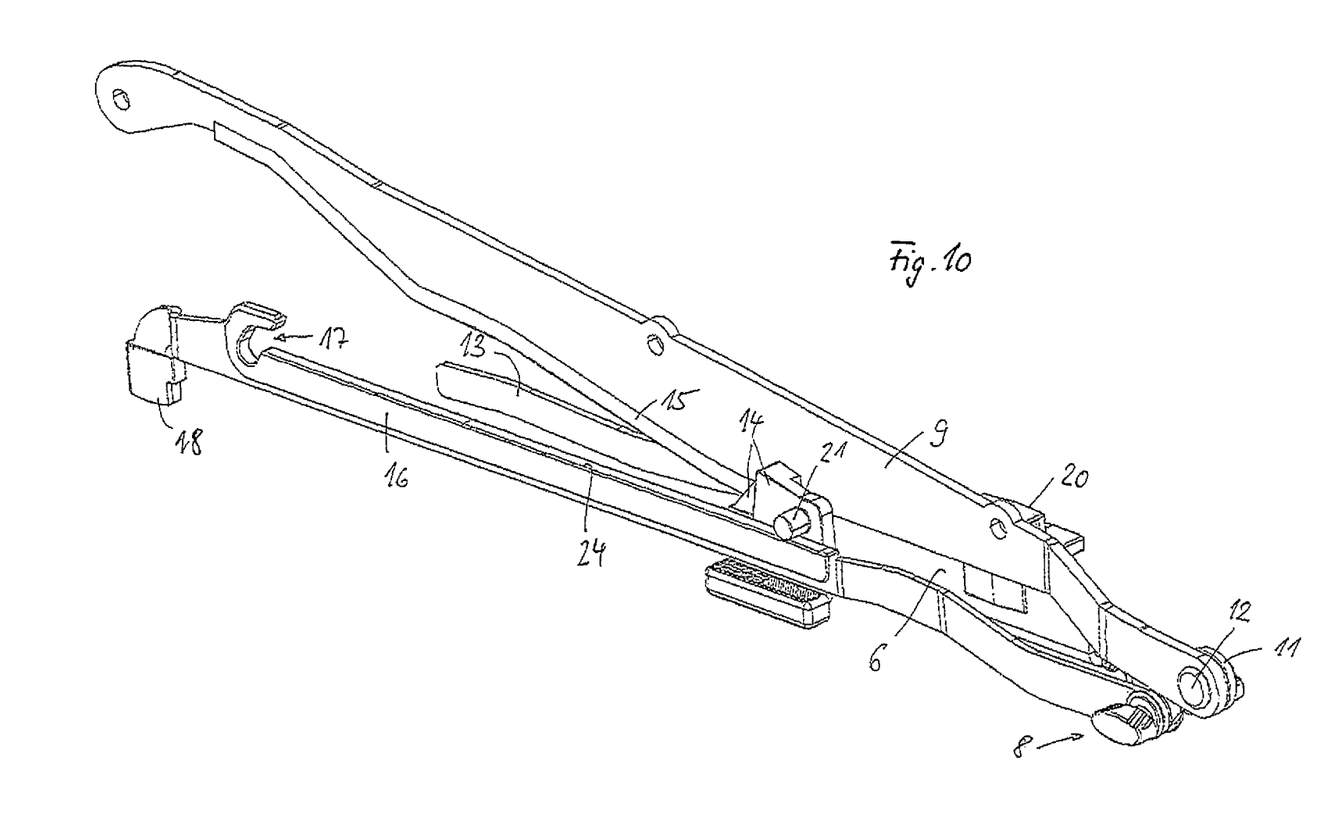
FIG. 10 shows, in an enlarged perspective illustration, the drive system in the ventilation position according to FIGS. 8 and 9.
Figure 11:
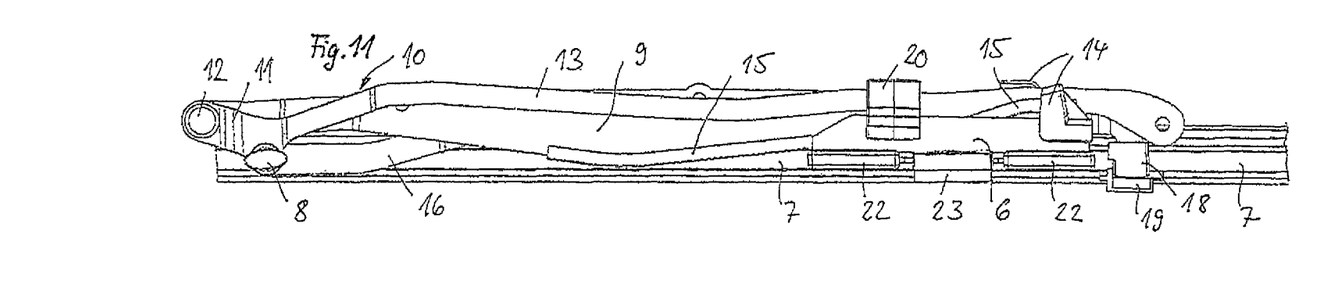
FIG. 11 shows the drive system according to FIGS. 5 and 8 in an intermediate position according to FIG. 3.
Figure 12:
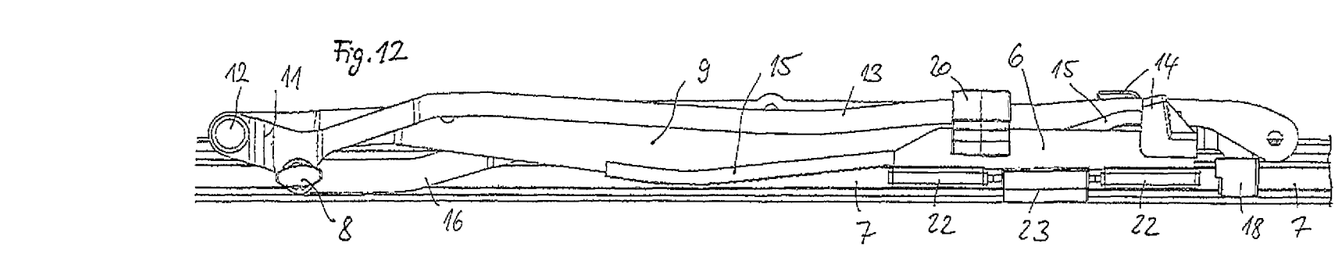
FIG. 12 shows the drive system according to FIG. 11 in an open position according to FIG. 4.
Figure 13:
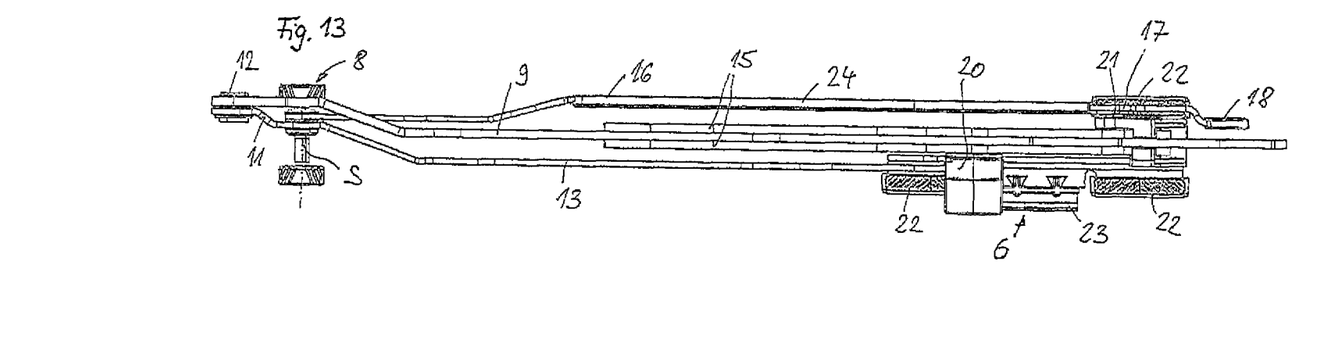
FIG. 13 shows a top view of the drive system according to FIG. 11 or 12.
Figure 14:
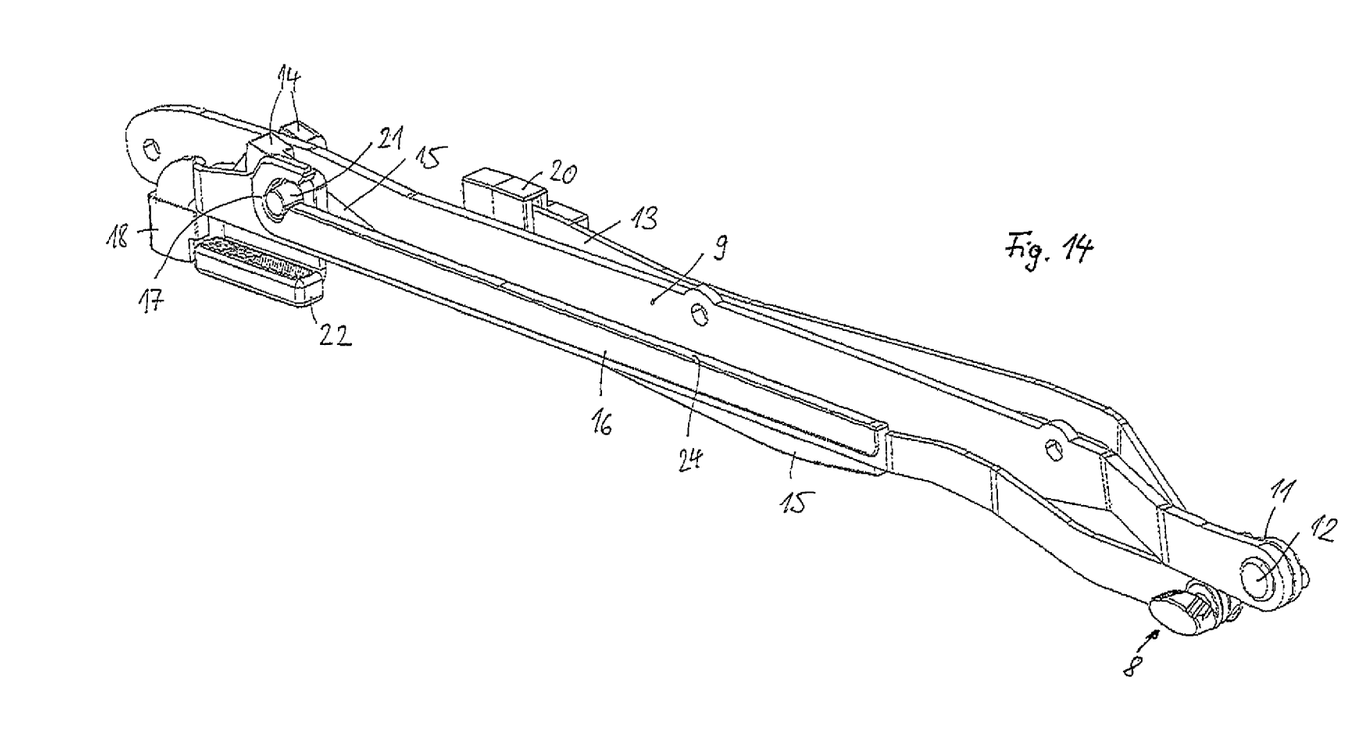
FIG. 14 shows, in an enlarged perspective illustration, the drive system according to FIG. 11 or 12, i.e. in the intermediate position or in the open position.

If the control carriage 6 is now moved out of this position according to FIGS. 8 to 10 rearward along the guide rail arrangement 7 and under the stationary roof region 3, the support bar 9 is inevitably pulled downward into the intermediate position according to FIG. 3. As long as the control carriage 6 with the driver pin 21 has not yet reached the driver slot 17 of the latching lever 16, the latching lug 18 remains trapped in the latching receptacle 19 of the guide rail arrangement 7. In FIG. 11, the intermediate position which corresponds to the illustration according to FIG. 3 is reached. In said intermediate position, the driver pin 21 has entered the driver slot 17 of the latching lever 16 and inevitably pulls the latching lug 18 upward out of the latching receptacle 19 of the guide rail arrangement 7. Up to this point, the latching lever 16 has blocked the front guide arrangement 8 against a movement rearward. By means of the latching lug 18 being freed from the latching receptacle 19 and the latching lever 16 being carried along by the driver pin 21, the front guide arrangement 8 can now be moved rearward together with the control carriage 6, and therefore the roof part 4 can slide along under the stationary roof region 3. As soon as the control carriage 6 has reached the rear end position thereof according to FIG. 4, the roof part 4 is arranged completely below the stationary roof region 3, and therefore the roof part 4 is in the open position thereof, in which the roof opening to be closed by the roof part 4 is completely released.

If the roof part 4 is intended to be shifted forward again out of said opening position according to FIG. 4, the control carriage 6 will move forward again in a simple manner. In the process, the driver block 21 is removed again forward from the driver slot 17, and therefore the driver block 21 rests again on the sliding surface 24 of the latching lever 16. The control carriage 6, during the movement thereof forward, carries along the support bar 9. By means of the pressure of the driver pin 21 against the sliding surface 24, the latching lug 18 inevitably enters the latching receptacle 19 again as soon as the latching lever 16 passes over the latching receptacle 17 in the guide rail arrangement 7. As a result, the front guide arrangement 8 is blocked again within the guide rail arrangement 7, and therefore the support bar 9 can be moved upward again via the control slide 15 and the control bar 13 and the compensating extension 11 in such a manner that the roof part 4 is transferred into the closed position thereof according to FIG. 1. The compensating movements which the pivot joint 12 carries out about the pivot axis S ensure that the front and the rear end edge region of the roof part 4 can move past the corresponding stationary roof boundary surfaces, such as a front roof frame or a rear edge of the roof opening, which is to be closed by the roof part 4, without coming into contact with the corresponding edge sections.

The invention claimed is:

1. A drive system for a movable roof part of a motor vehicle roof module, with at least one support bar fastened laterally to the roof part, with at least one control carriage movable linearly via a drive arrangement in a guide track running laterally along the roof part, with at least one deployment mechanism which pivots, raises and lowers the support bar and therefore the roof part, and with a stationary roof region arranged behind the movable roof part in the longitudinal direction of the vehicle, the movable roof part being pivotable from a closed position into a ventilation position, lowerable into an open position and movable rearward under the roof region, the support bar being mounted at a front end region thereof on a compensating element so as to be pivotable about a pivot joint, the compensating element, depending on the movement position of the roof part, being shiftable relative to a front guide arrangement of the deployment mechanism into different positions, the compensating element comprising a compensating lever mounted on the front guide arrangement so as to be pivotable about a pivot axis, the compensating lever comprising a control section and a compensating extension respectively located on opposite sides of the pivot axis, the compensating extension bearing the pivot joint of the support bar and the control section being coupled mechanically to the control carriage.

2. The drive system as claimed in claim 1, wherein the control section is mechanically coupled to the control carriage by a slotted guide mechanism which combines a relative longitudinal displacability with a relative vertical shiftability between the control section and the control carriage in order, depending on the movement position of the roof part and of the support bar, to bring about a pivoting of the compensating extension about small pivot angles.

3. The drive system as claimed in claim 2, wherein the slotted guide mechanism comprises a wraparound profile which wraps around the control section at least in sections, and the control section is designed as a rigid control bar provided with sections of curvature distributed in the vertical direction over a length thereof.

4. The drive system as claimed in claim 3, wherein the wraparound profile is arranged rigidly on the control carriage.

5. The drive system as claimed in claim 1, wherein the front guide arrangement is movable in the guide track in which the control carriage moves.

6. The drive system as claimed in claim 1, further including a latching arrangement, the latching arrangement, depending on a movement position of the roof part and of the support bar relative to the guide track, blocking the front guide arrangement or releasing the front guide arrangement for longitudinal shifting.

7. The drive system as claimed in claim 6, wherein the latching arrangement has a latching lever, the latching lever in a locking position thereof, is supported in a form-fitting manner in a latching receptacle of the guide track, and the control carriage has a driver arrangement, wherein the driver arrangement, depending on the movement position of the roof part and of the support bar, lifts the latching lever out of the latching receptacle and carries along the latching lever.

8. The drive system as claimed in claim 7, wherein the latching lever is coupled to the front guide arrangement so as to be pivotable about the pivot axis of the compensating lever.

9. The drive system as claimed in claim 8, wherein the latching lever extends rearwardlyu from the pivot axis and, on a rear end region thereof, has a latching lug which interacts in a form-fitting manner with the latching receptacle of the guide track.

10. A drive system for a movable roof part of a motor vehicle roof module, with at least one support bar fastened laterally to the roof part, with at least one control carriage movable linearly via a drive arrangement in a guide track running laterally along the roof part, with at least one deployment mechanism which pivots, raises and lowers the support bar and therefore the roof part, and with a stationary roof region arranged behind the movable roof part in the longitudinal direction of the vehicle, the movable roof part being pivotable from a closed position into a ventilation position, lowerable into an open position and movable rearward under the roof region, the support bar being mounted at a front end region thereof on a compensating element so as to be pivotable about a pivot joint, the compensating element, depending on the movement position of the roof part, being shiftable relative to a front guide arrangement of the deployment mechanism into different positions, the drive system further including a latching arrangement, the latching arrangement, depending on a movement position of the roof part and of the support bar relative to the guide track, blocking the front guide arrangement or releasing the front guide arrangement for longitudinal shifting.

11. The drive system as claimed in claim 10, wherein the latching arrangement has a latching lever, the latching lever in a locking position thereof, is supported in a form-fitting manner in a latching receptacle of the guide track, and the control carriage has a driver arrangement, wherein the driver arrangement, depending on the movement position of the roof part and of the support bar, lifts the latching lever out of the latching receptacle and carries along the latching lever.

12. The drive system as claimed in claim 11, wherein the latching lever is coupled to the front guide arrangement so as to be pivotable about the pivot axis of the compensating lever.

13. The drive system as claimed in claim 12, wherein the latching lever extends rearwardly from the pivot axis and, on a rear end region thereof, has a latching lug which interacts in a form-fitting manner with the latching receptacle of the guide track.

* * * * *